(12) United States Patent
Rashidi

(10) Patent No.: US 7,845,904 B2
(45) Date of Patent: Dec. 7, 2010

(54) WIND HARNESSING SYSTEM

(75) Inventor: Majid Rashidi, Pepper Pike, OH (US)

(73) Assignee: Cleveland State University, Cleveland, OH (US)

( * ) Notice: Subject to any disclaimer, the term of this patent is extended or adjusted under 35 U.S.C. 154(b) by 740 days.

(21) Appl. No.: 11/746,319

(22) Filed: May 9, 2007

(65) Prior Publication Data

US 2008/0279690 A1  Nov. 13, 2008

(51) Int. Cl.
*F03D 1/02* (2006.01)
*F03D 1/04* (2006.01)

(52) U.S. Cl. .................... 416/60; 415/909; 416/120

(58) Field of Classification Search ............... 415/60, 415/213.1, 215.1, 909; 416/120, 121, 122; 52/40, 65, 651.01, 651.07
See application file for complete search history.

(56) References Cited

U.S. PATENT DOCUMENTS

| | | | |
|---|---|---|---|
| 756,372 | A | 4/1904 | Johnson |
| 1,057,233 | A | 3/1913 | DeGeofroy |
| 1,876,595 | A | 9/1932 | Beldimano |
| 2,418,439 | A | 4/1947 | Wetherill |
| 3,726,476 | A | 4/1973 | Porter et al. |
| 3,936,984 | A * | 2/1976 | Yando ............... 52/2.19 |
| 4,088,419 | A | 5/1978 | Hope et al. |
| 4,140,433 | A | 2/1979 | Eckel |
| 4,156,579 | A | 5/1979 | Weisbrich |
| 4,156,580 | A | 5/1979 | Pohl |
| 4,236,083 | A | 11/1980 | Kenney |
| 4,288,199 | A * | 9/1981 | Weisbrich ............... 415/232 |
| 4,348,594 | A | 9/1982 | Lipfert |
| 4,421,452 | A | 12/1983 | Rougemont |
| 4,540,333 | A | 9/1985 | Weisbrich |
| 4,708,592 | A | 11/1987 | Krolick et al. |
| 4,725,194 | A | 2/1988 | Bartsch |
| 4,764,683 | A | 8/1988 | Coombes |
| 5,062,765 | A | 11/1991 | McConachy |
| 5,137,417 | A | 8/1992 | Lund |
| 5,313,103 | A | 5/1994 | Hickey |
| 5,520,505 | A | 5/1996 | Weisbrich |

(Continued)

FOREIGN PATENT DOCUMENTS

WO  WO 02/084115  10/2002

(Continued)

OTHER PUBLICATIONS

Alfred L. Weisbrich, Gunther J. Weisbrich, William Smith, "Naval & non-Naval Warp Offshore Wind Power Systems With Integral Fuel Cells". Jan. 6-9, 2003, AIAA and ASME 41st Aerospace Sciences Meeting and Exhibit, retrieved from <http://www.warp-eneco.com/documents.php> on Jan. 28, 2010.*

(Continued)

*Primary Examiner*—Edward Look
*Assistant Examiner*—Jesse Prager
(74) *Attorney, Agent, or Firm*—Calfee, Halter & Griswold LLP

(57) ABSTRACT

A wind harnessing system comprises a substantially grooved shell disposed about a rigid frame. The grooved shell can be constructed of lightweight shell panels connected to one another and to the frame. Alternatively, the grooved shell can be constructed of inflatable shell sections.

29 Claims, 16 Drawing Sheets

U.S. PATENT DOCUMENTS

| | | | |
|---|---|---|---|
| 6,132,172 | A | 10/2000 | Li |
| 6,158,953 | A | 12/2000 | Lamont |
| 6,278,197 | B1 | 8/2001 | Appa |
| 6,519,901 | B1 | 2/2003 | Nelson et al. |
| 6,626,638 | B2 | 9/2003 | Rosefsky |
| 7,172,386 | B2 * | 2/2007 | Truong et al. ............... 415/4.1 |
| 2002/0180216 | A1 | 12/2002 | McDavid |
| 2005/0166521 | A1 * | 8/2005 | Silber ......................... 52/633 |
| 2006/0273597 | A1 | 12/2006 | Rashidi |
| 2009/0015017 | A1 | 1/2009 | Rashidi |

FOREIGN PATENT DOCUMENTS

WO            06/133122          12/2006

OTHER PUBLICATIONS

International Search Report and Written Opinion from PCT/US08/63151, mailed Aug. 7, 2008.

Eneco, "Wind Amplified Rotor Platforms", http://www.warp-eneco.com/warp.php, Accessed on the World Wide Web on Oct. 10, 2006, pp. 1-3.

International Search Report from co-pending International Application No. PCT/US2006/021791, with an International Filing Date of Jun. 5, 2006; claiming benefit of U.S. Appl. No. 60/687,622, filed Jun. 3, 2005 entitled "Wind Harnessing System" (Applicant: Cleveland State University).

Alter, "Mag-Wind Vertical Axis Turbine for your Home", Science & Technology, Toronto, Jan. 22, 2007, http://www.treehugger.com/files/2007/01/magwind_vertica.php, printed Mar. 2, 2007.

Blevins, "Flow Induced Vibration", Figs. 3-21(a) and accompany text; Rao, SS, Mechanical Vibration 4th Ed., Figs. 3.30(a) and 3.30(b).

International Search Report and Written Opinion from PCT/US08/68888 mailed Sep. 3, 2008.

Office action from U.S. Appl. No. 11/445,663 mailed Apr. 4, 2008.

Amendment from U.S. Appl. No. 11/445,663 mailed Jul. 6, 2008.

Notice of Allowance from U.S. Appl. No. 11/445,663 mailed Sep. 23, 2008.

Notice of Allowance from U.S. Appl. No. 11/445,663 dated Jan. 7, 2009.

* cited by examiner

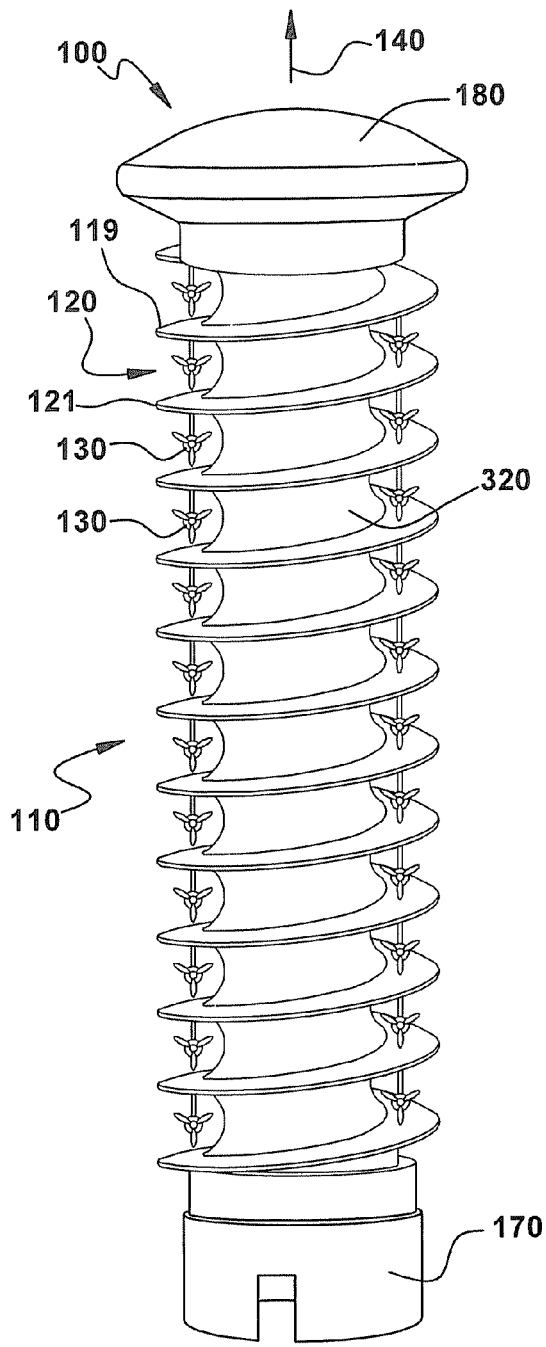
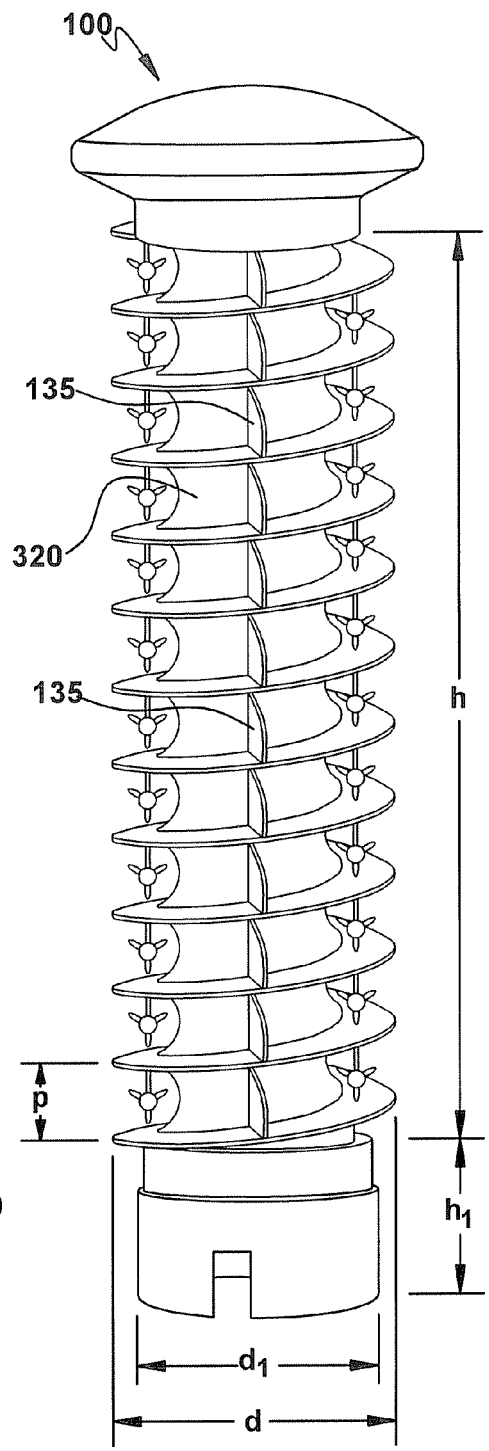
FIG. 1
FIG. 2

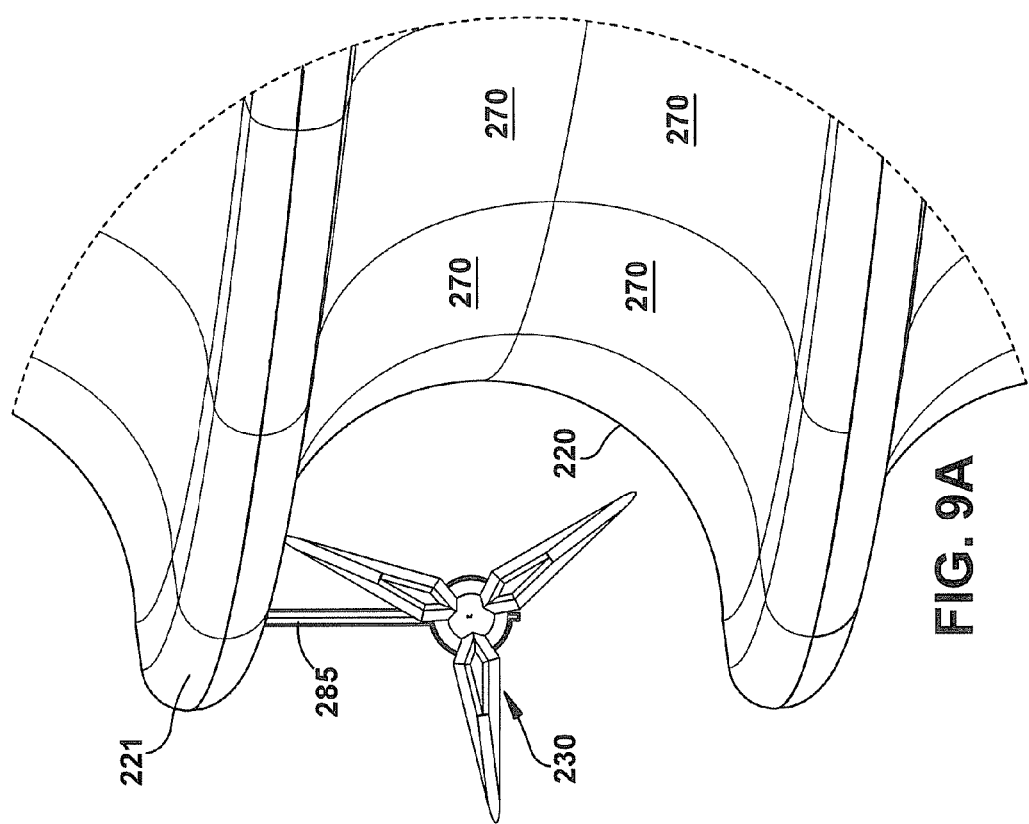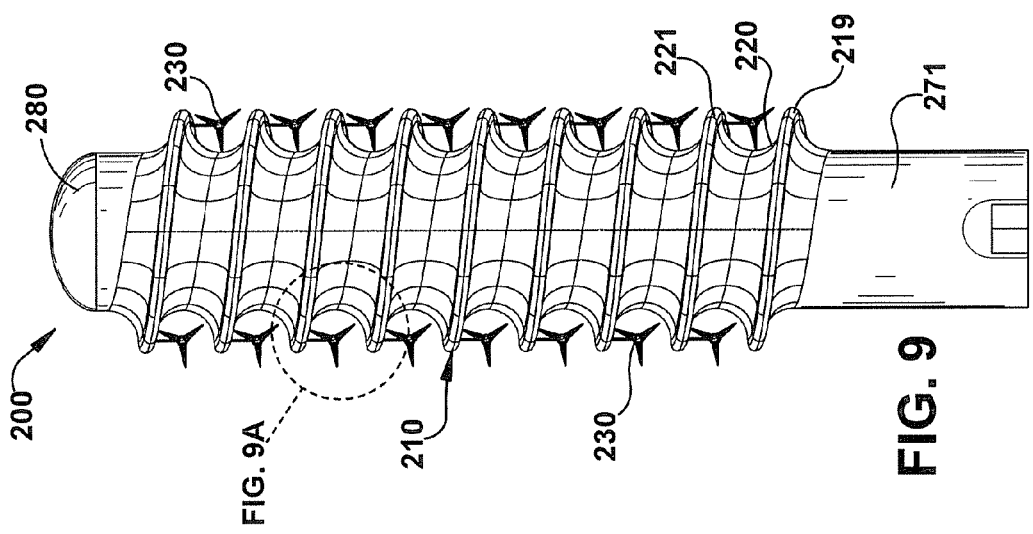

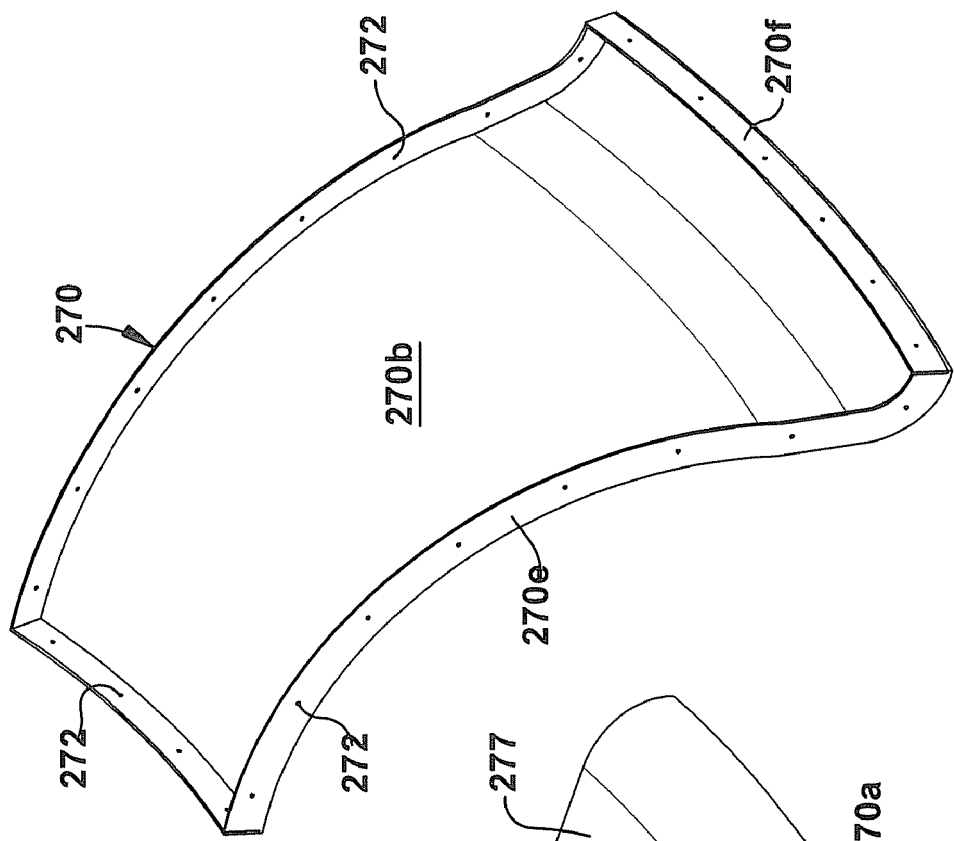
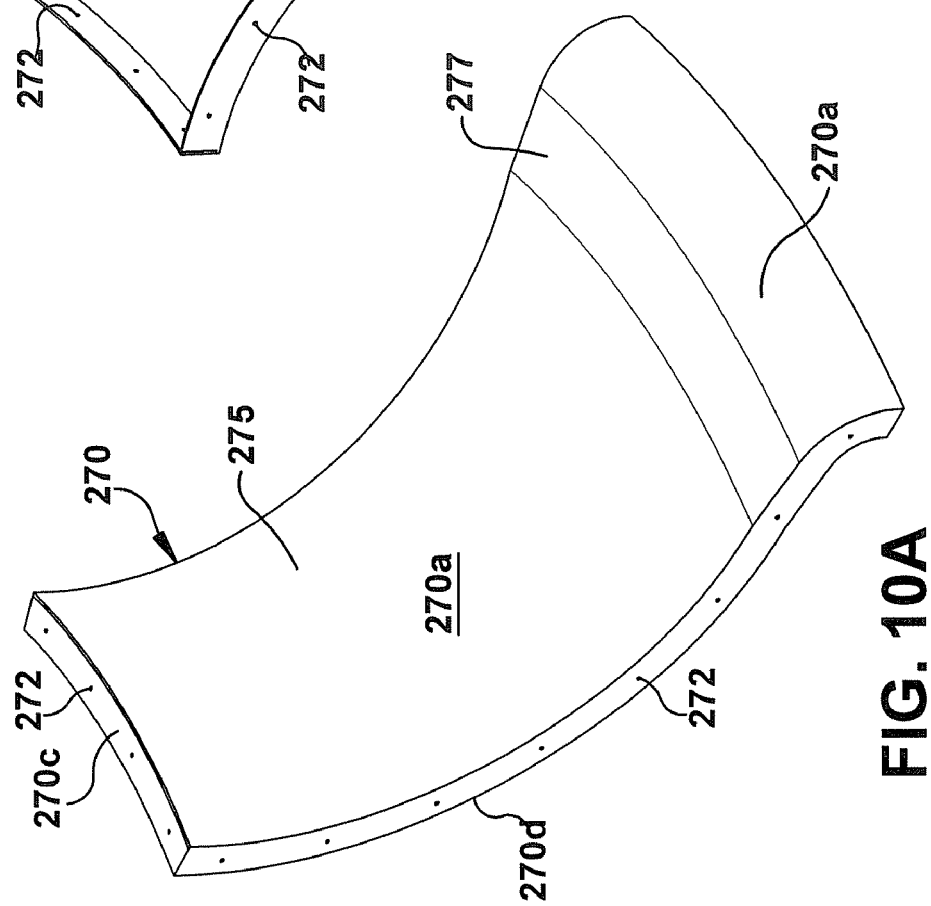
FIG. 10B
FIG. 10A

WIND HARNESSING SYSTEM

BACKGROUND OF INVENTION

The present invention relates to devices for use in collecting wind energy. Harnessing energy through the collection of wind power is an attractive energy source when compared with other forms of energy collection. For example, energy collection through the burning of fossil fuels depletes limited natural resources and creates pollution. In contrast however, wind energy is a renewable power source and collecting it generates minimal pollution.

SUMMARY OF THE INVENTION

A wind harnessing system comprises a light weight wind deflecting structure that defines a wind groove through which wind is accelerated and an energy converter positioned at least partially within the groove. The wind deflecting structure may include a portion of a helix to form a spiraling wind groove.

The wind deflecting structure is formed by a lightweight shell connected to an internal mounting frame. The lightweight shell may be constructed from lightweight shell panels made of, for example, plastic or fiberglass. The shell panels may be identical to one another and include integral features that facilitate fastening the panels to one another and to the internal frame. Energy converters such as turbines may be mounted to the mounting frame on hangers that place them between a core and ridge of the shell. The hangers may be slidably mounted to struts that extend from the internal frame such that the turbines can be moved toward the core of the shell for maintenance. The shell may also include access doors and the internal frame may include platforms that fold out through the doors.

Alternatively, the shell may be constructed from one or more inflatable shell sections, which, when inflated, can be connected to the mounting frame to form at least a portion of the wind deflecting structure.

BRIEF DESCRIPTION OF THE DRAWINGS

FIG. 1 illustrates one embodiment of the inventive wind harnessing system viewed from the windward side.

FIG. 2 illustrates the wind harnessing system of FIG. 1 when viewed from the leeward side.

FIG. 9 is a front view of a wind harnessing system having a grooved shell made of shell panels.

FIG. 9A is an enlarged view of a portion of the wind harnessing system of FIG. 9.

FIGS. 10A and 10B are front and rear perspective views of a shell panel used to construct the wind harnessing system of FIG. 9.

DETAILED DESCRIPTION OF THE INVENTION

Figure 3:
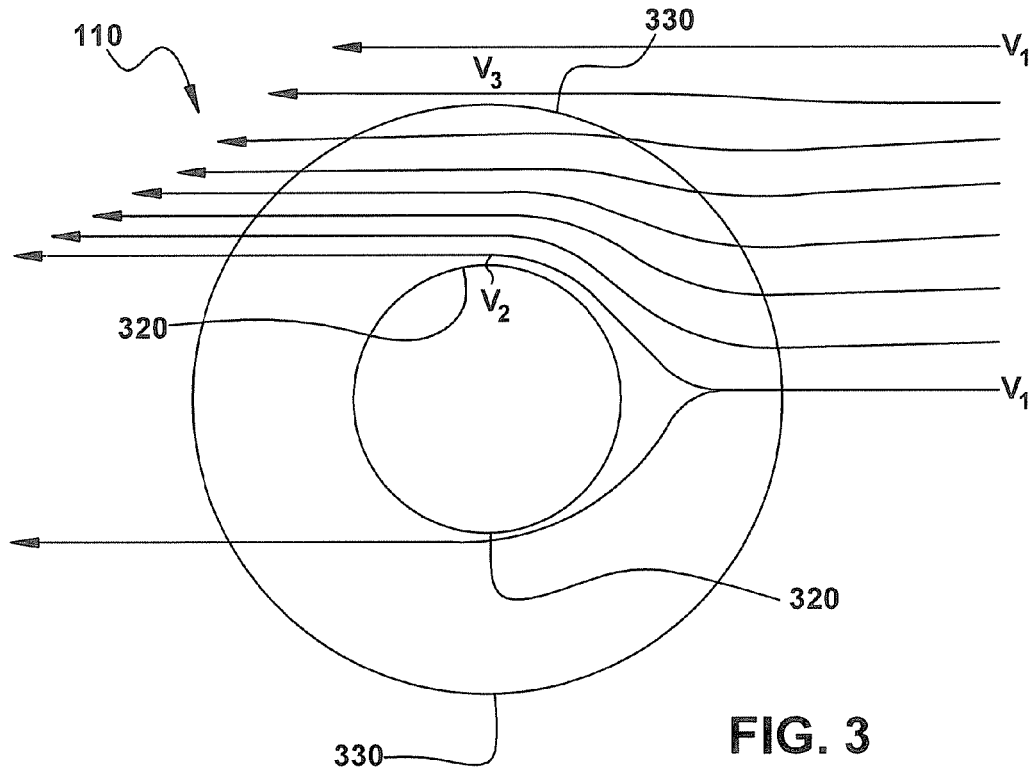
FIG. 3 is a schematic illustration of the wind flow velocity profile of wind traveling through a portion of the spiraling groove of the wind harnessing system of FIGS. 1 and 2.

For the purposes of this disclosure, "invention" and "inventive" refer to the legal invention defined by the combination of features recited in the attached claims in their final form (i.e. after completion of examination), with no additional features being added thereto. In contrast, "embodiment" refers to specific examples of this legal invention such as illustrated in the drawings and otherwise described in this disclosure.

As shown in FIGS. 1 and 2, one embodiment of the inventive wind harnessing system 100 includes helical structure 110 and spiraling groove 120 defined by adjacent spiraling threads 119 and 121 which spiral around central core 320 of helical structure 110 and are preferably stationary with respect to one another. In the particular embodiment shown, spiraling groove 120 extends about twelve revolutions around longitudinal axis 140 of central core 320, although any number of full or partial revolutions around central core 320 are possible depending on the desired application. In addition, spiraling groove 120 need not form complete revolutions around central core 320 of the helical structure. In other words, partial revolutions can also be used.

The helical structure of the wind harnessing system may be fabricated from any construction materials and/or processes. A non-limiting example is a frame with a skin covering assembly. The skin covering assembly may be constructed of, for example, fiberglass, aluminum, fabric, canvas, paper, plastics, polymers, or combinations thereof. Various construction methods such as, for example, a plurality of unibody structures that may be field assembled to obtain the desired number of revolutions, or attaching a helical fin structure to a cylinder shell may be used. Particular materials and methods used in fabrication of the helical structure depend on the construction application employed.

The overall size and shape of the helical structure depends on the particular application. In one embodiment, helical structure 110 of about one-hundred and thirty feet in height, h, and about thirty feet in diameter, d, having about eleven feet in pitch, p, is utilized. Obviously, helical structure 110 may have a different height, h, diameter, d, and pitch, p, depending on the application. Further, in other embodiments not shown, the diameter of the substantially helical structure need not be constant throughout the structure. For example, embodiments of the wind harnessing system may include a substantially helical structure that has a conical profile.

As further shown in FIGS. 1 and 2, energy converters 130 are positioned at least partially within spiraling groove 120 of helical structure 110. Energy converters 130 may be any device used in converting the energy of the wind into electrical energy. In the illustrated embodiments, energy converters 130 are turbines having blades with a propeller diameter of about six to ten feet. Alternate embodiments of the wind harnessing system may include one or more energy converters with larger or smaller dimensions depending on the desired application.

As shown in FIG. 2, wind harnessing system 100 includes baffles 135 that are positioned at least partially within spiraling groove 120 of helical structure 110. Baffles 135 at least partially inhibit wind from traveling up spiraling groove 120. Inhibiting wind flow from traveling up spiraling groove 120 of helical structure 110 prevents the wind from decreasing the wind velocity around energy converters located above lower baffles. Embodiments without baffles 135 are also contemplated, as well as embodiments that include one or more baffles 135. In some embodiments, baffle(s) 135 may also be used to aid in directing energy converter(s) 130 into the prevailing wind.

As shown in FIGS. 1 and 2, wind harnessing system 100 of this embodiment also includes optional base 170 for supporting, and optional roof 180 for capping, helical structure 110. It should be apparent to one skilled in the art that roof 180 need not be any particular shape or form, or even exist at all. The illustrated embodiment of wind harnessing system 100 includes base 170 having a height, $h_1$, and a diameter, $d_1$. For one application, base 170 of about thirty feet in height, $h_1$, and about twenty-five feet in diameter, $d_1$, may be used. Base 170 may have a different height, $h_1$, and a different diameter, $d_1$, depending on the application. Base 170 need not position helical structure 110 at any particular elevation, or even be an elevated base, as helical structure 110 may start at ground level.

FIG. 3, which illustrates an exemplary wind flow velocity profile near helical structure 110, shows that the shape of helical structure 110 amplifies or increases wind velocity flowing near the structure. Thus, wind flow approaches helical structure 110 at a velocity $v_1$ and then diverges at $v_2$ around central core 320 of helical structure 110. (The wind flow travels around both sides of helical structure 110, although the wind flow velocities are only shown for one side.) As the wind flows past helical structure 110, in the area closest to central core 320, the velocity $v_2$, is greater than the velocity $v_1$. In this case velocity $v_2$ is approximately 1.8 times velocity $v_1$. However, the velocity $v_3$ near crest or ridge 330 of helical structure 110 is approximately equal to velocity $v_1$. The velocity of the wind flow in the area between central core 320 and ridge 330 averages between velocity $v_1$ and velocity $v_2$. Thus, the wind flow velocity near helical structure 110 has a velocity of up to approximately 1.8 $v_1$. Energy converter(s) located at least partially within a portion of a spiraling groove will be subject to higher wind velocities than if they were located outside the spiraling groove.

By locating energy converter(s) at least partially within the spiraling groove of the helical structure, the wind harnessing system takes advantage of this increased wind velocity. Since wind power conversion is cubically related to wind speed, a two fold increase in wind velocity results in an eight fold increase in energy output. Thus, the incremental increase in wind velocity passing over the energy converter(s) results in a system that harnesses increased wind energy.

Preferably, energy converters 130 are positioned to face into the prevailing wind. Two methods, rotating helical structure 110, and rotating energy converters 130, are discussed below. In one embodiment of the wind harnessing system (not shown), the helical structure may be rotatably mounted upon a base to allow at least partial rotation of the helical structure. For example, the structure may rest upon a rotator (not shown) that may be used to rotate the helical structure about its longitudinal axis into a desired position so that the energy converters are facing into the wind. The rotation may be powered by an external motive source, such as an electric motor, or by the wind ("freely rotatable").

Free rotation may be achieved through the use of any mounting system allowing a low friction rotation of the helical structure upon a base. At least one baffle, as described above, may be located at least partially within the spiraling groove of the helical structure. As shown in FIG. 2, baffles 135 are preferably located downstream (i.e., the leeward side) of energy converters 130 so that they also may act as a sail to position fixed energy converters 130 into (i.e., facing) the wind in addition to blocking the wind flow from traveling up spiraling groove 120. Optionally, the freely rotatable helical structure may be provided with a speed regulating device to prevent sporadic wind gusts from rotating the system too fast. In alternate embodiments the helical structure may be fixed to the base in a non-rotatable fashion, and the energy converter(s) may be moveably mounted to face into the wind flow.

Figure 5:
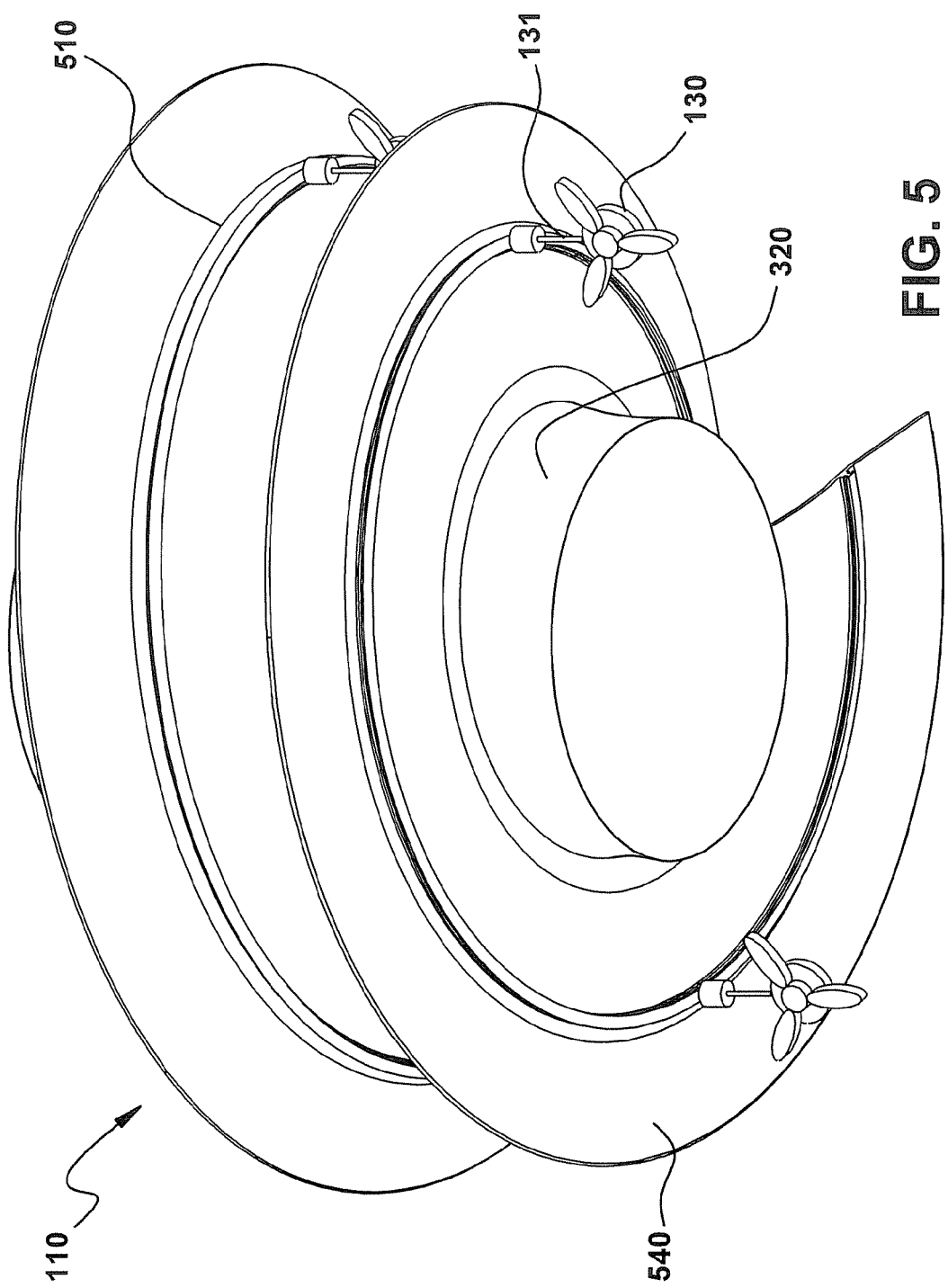
FIG. 5 is a upward-looking perspective view illustrating the manner in which the energy converters are mounted to a portion of a helical structure of an embodiment of the wind harnessing system.

Energy converters 130 need to be located at least partially within spiraling groove 120 of helical structure 110. As explained above, this location allows energy converters 130 to take advantage of the amplified wind velocity provided by the shape of helical structure 110. FIG. 5 illustrates another embodiment of the inventive wind harnessing system in which energy converters 130 are mounted on, or supported from, track 510 on the underside of thread 540 of helical structure 110. In alternate embodiments (not shown), energy converters 130 may be mounted on, or supported from, thread 540 of helical structure 110 that is located below energy converter 130, or be mounted on, or supported from, central core 320 of helical structure 110. In yet other embodiments, energy converters 130 may mount to multiple locations, such as, for example on both the threads above and the threads below the location of energy converter 130. Energy converters 130 may be mounted in any manner as long as they are mounted at least partially within spiraling groove 120 of helical structure 110.

In the embodiment illustrated in FIG. 5, energy converters 130 are carried by mounting arms 131 which are moveably mounted on monorail or track 510 running along the underside of thread 540 of the spiraling groove. A drive mechanism (not shown) moves energy converters along track 510 for positioning these energy converters into the wind without rotation of helical structure 110.

In the particular embodiment shown, energy converters 130 are mounted on mounting arms 131 so that they always face tangentially with respect to track 510. With this arrangement, energy converters 130 will face directly into wind approaching from a direction perpendicular to the radius the helical structure intersecting this tangent. In other embodiments, energy converters can be mounted to rotate about mounting arms 131 so that they can be moved to face directly into the wind solely by this rotation, i.e., without rotating helical structure 110 and without moving these energy converters along track 510. Baffles (not shown) may also be moveably mounted on track 510. Track 510 allows attachment of baffles to the drive mechanism so the baffles move with energy converters 130 and thus remain downstream of energy converters 130 in wind flow.

Energy converters 130 and baffles may be mounted on trolleys that ride on track 510 and are mechanically linked to one another by, for example, chains and intermediate trolleys, allowing for all of the energy converters and baffles to be moved together. Optionally, groups of energy converters may be linked together and moved in groups. Still yet, each energy converter 130 may be individually moveable around helical structure 110.

Various drive mechanisms may be used to move energy converter(s) 130 and/or baffle(s) 135 individually or collectively. For example, the drive mechanism may include one or more motorized trolleys, a pulley and cable system, or any means that allow energy converters 130 to be moved along track 510 about helical structure 110. Optional drive systems may include, for example, electrically driven or hydraulically driven systems.

In still another embodiment of the inventive wind harnessing system, energy converters 130 and baffles 135 may be removed from helical structure 110 by moving them along track 510 to one end of helical structure 110. Once they reach the end (preferably the bottom) of helical structure 110, energy converters 130 and baffles 135 may be removed from track 510 for maintenance or replacement. Another embodiment includes access doors (not shown) in the helical structure for access to energy converters and baffles.

Figure 4:
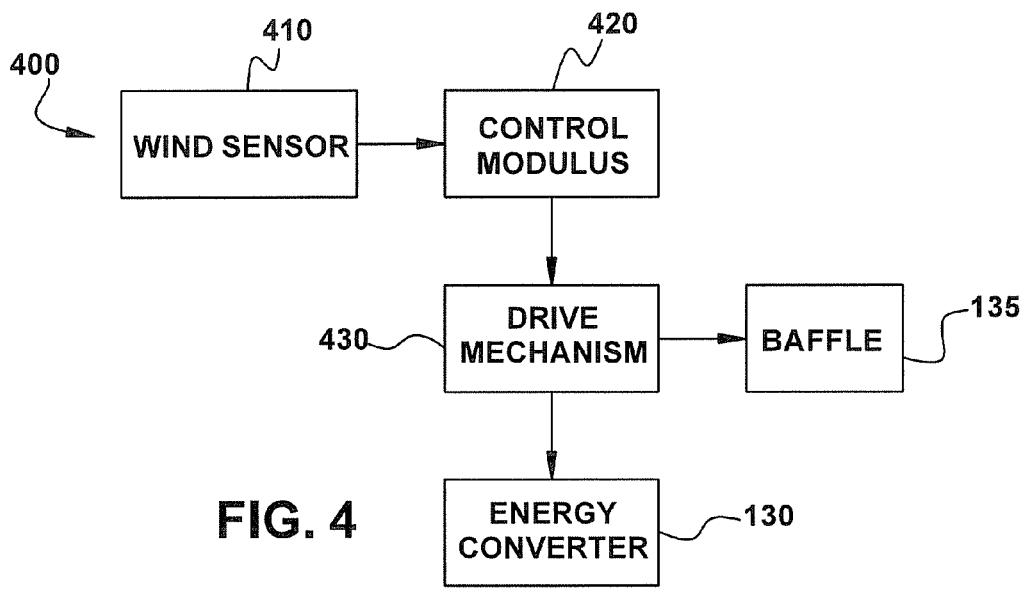
FIG. 4 is a high level schematic diagram of a control system for use in the inventive wind harnessing system.

FIG. 4 illustrates control system 400 that may be employed for positioning energy converter(s) 130 and baffle(s) 135 along track 510. Wind direction sensor 410 detects the direction of the prevailing wind flow. Control modulus 420 receives the input from wind direction sensor 410, and transmits the appropriate signals to drive mechanism 430. Drive mechanism 430 positions energy converter(s) 130 and baffle(s) 135 into the prevailing wind flow.

Figure 6:
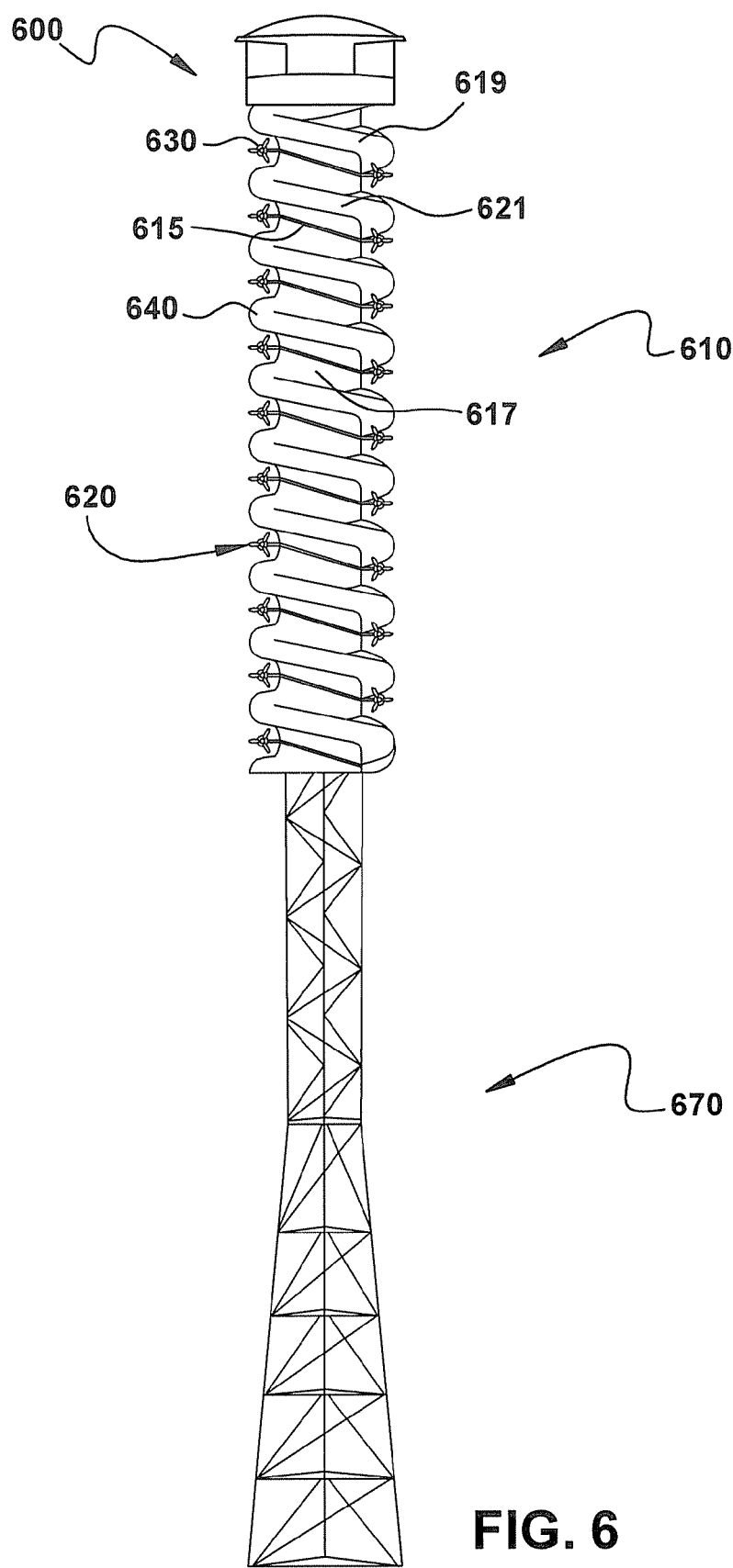
FIG. 6 is an illustration of another embodiment of a wind harnessing system.

FIG. 6 depicts yet another embodiment of the inventive wind harnessing system. In this embodiment, wind harnessing system 600 includes base 670 having a tower arrangement, and helical structure 610. Helical structure 610 has spiraling groove 620 with rounded threads 640. Energy converters 630 and the baffles (not shown) are moveably mounted on track 615 that is attached to central core 617 of the helical structure midway between threads 619 and 621 which define spiraling groove 620.

Figure 7:
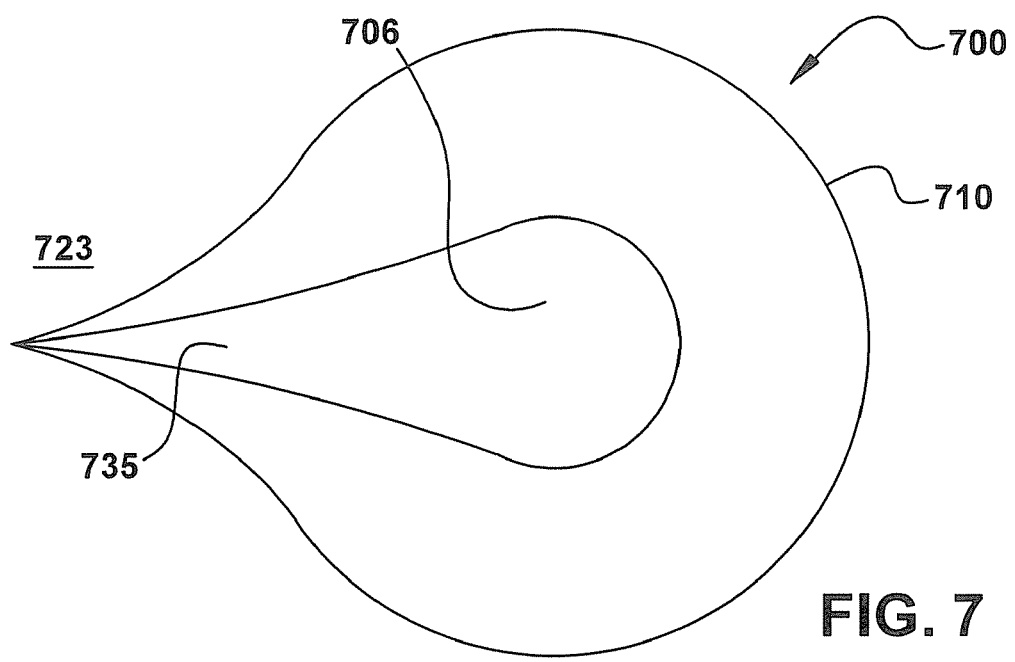
FIG. 7 is a top view of a substantially helical structure of another embodiment of a wind harnessing system.
Figure 8:
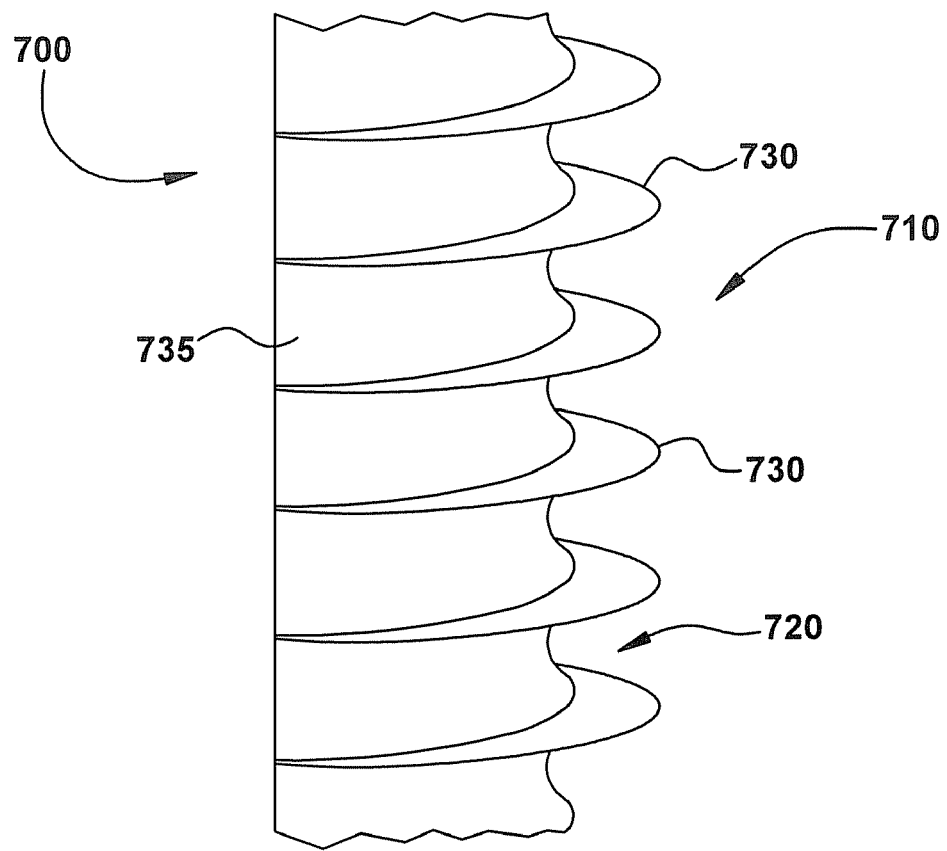
FIG. 8 is a side view of a portion of the embodiment of a wind harnessing system depicted in FIG. 7.

FIGS. 7 and 8 illustrate still another embodiment of the inventive wind harnessing system 700 in which central core 706 of helical structure 710 has a teardrop configuration (FIG. 7) whereby leeward side 723 of the structure defines baffle portion 735 therein. In the particular embodiment shown, baffle 735 extends continuously from the top to the bottom of helical structure 710. However, it is also possible for baffle 735 to be discontinuous and, in addition, to extend along less than the entire height of the helical structure. In this embodiment, spiraling groove 720 is formed by adjacent threads or flights 730 which extend partially around helical structure 710 and connect to and terminate at wedge shaped baffle 735 instead of forming complete revolutions.

FIGS. 9-24 illustrate a helical wind deflecting structure 200 that includes a helical shell 210 constructed from a plurality of shell panels 270 (FIG. 9A). The helical wind deflecting structure forms a spiraling groove 220 defined by pairs of adjacent spiraling ridges such as ridges 219, 221 that spiral around a central core 220 of the helical shell 210. The wind deflecting structure is presented as part of a wind deflecting tower that includes a tower base 271 and a tower cap 280. It will be apparent that both the base and cap need not be of any particular shape and that neither the base nor the cap is necessary. A plurality of energy converting turbines 230 are disposed partially within the grove 220 between the adjacent spiraling ridges, for example, 219, 221 and the central core 220.

As shown in the fragmentary view in FIG. 9A, the shell 210 is constructed from shell panels 270 placed in abutting relationship to one another. The shell panels can be made from any suitable, and preferably lightweight, material such as, for example, plastic or fiberglass. For example, the shell panels 270 may be molded from plastic using a roto-molding process.

Referring now to FIGS. 10A and 10B, a single shell panel 270 is shown in greater detail. It will be apparent to one of skill in the art that the exact configuration of the individual shell panel will vary based on the overall shape of the wind deflecting structure and also that multiple sub-panels may be joined to form each shell panel. The shell panel 270 has an outer surface 270a that faces outward from the mounting structure (FIG. 15) and an inner surface 270b that faces the mounting structure. The perimeter of the shell is substantially trapezoidal in shape and has side flanges 270c-270f extending perpendicularly from its edges. The trapezoidal shape is defined by first and second congruent sides corresponding to the flanges 270d and 270e and first and second non-congruent sides corresponding to the flanges 270c and 270f. The first non-congruent side flange 270c is shorter than the second non-congruent side flange 270f. The shell panel 270 has a generally concave portion 275 that is proximate to the first non-congruent side flange 270c and forms a part of the central core 220 of the wind deflecting structure. The shell panel 270 has a generally convex portion 277 that is proximate to the second non-congruent side flange 270f and forms a part of the spiraling ridge 221 of the wind deflecting structure. As can also be seen in FIG. 11, the side flanges include fastener openings 272 that accept a bolt, rivet, or other fastening means. In addition to providing a convenient means of connecting the shell panels, the flanges also serve to stiffen the panels so that they can be substantially self-supporting.

Figure 12:
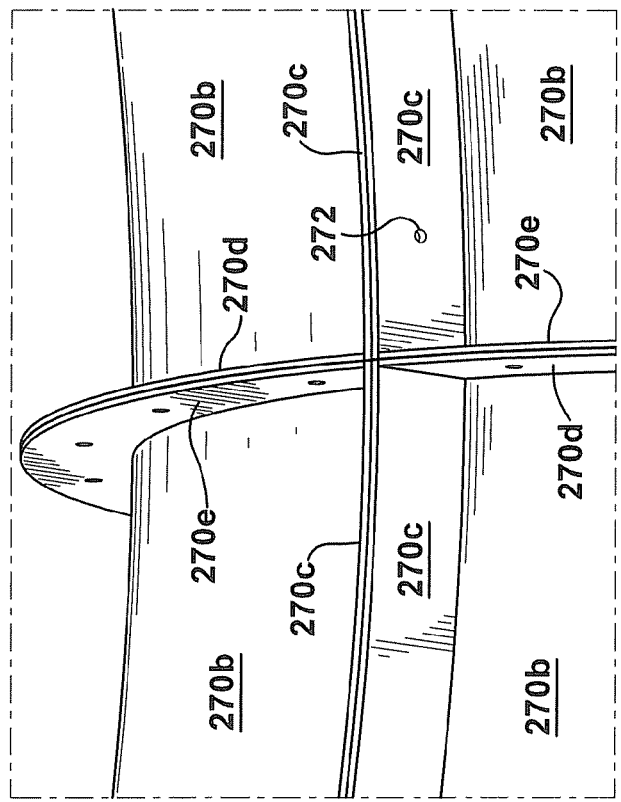
FIG. 12 is an enlarged view of connection alignment between four of the shell panels shown in FIGS. 10A and 10B.
Figure 11:
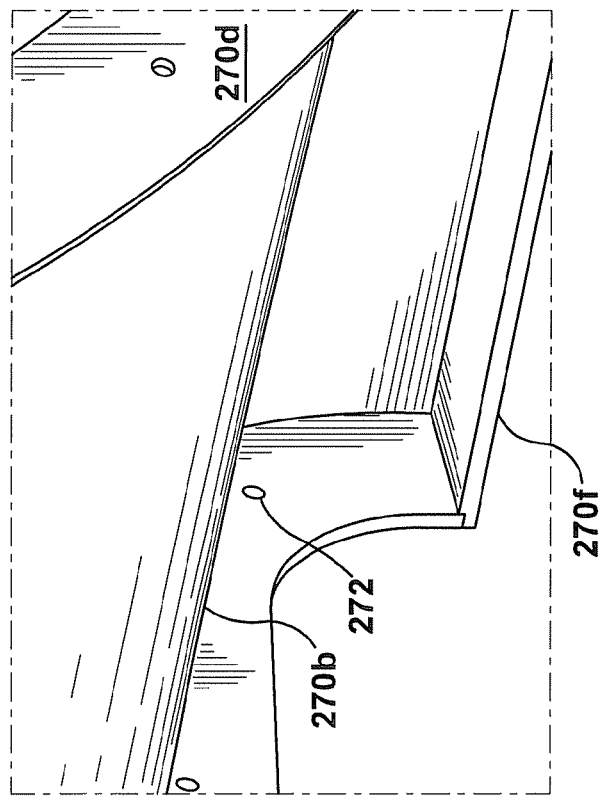
FIG. 11 is an enlarged view of a portion of the shell panel of FIGS. 10A and 10B.

FIG. 12 illustrates a connection between four shell panels 270. The shell panels are juxtaposed with respect to one another such that the first congruent side flange 270d is positioned adjacent to the second congruent side flange 270e. First non-congruent side flanges 270c of two mating shell panels are placed adjacent to one another. Second non-congruent side flanges 270f of two mating shell panels are placed adjacent to one another (not shown in FIG. 12). The fastener openings 272 in each side flange are aligned with openings in the adjacent flange and fasteners are passed through the openings to connect the adjacent shell panels.

Figure 14:
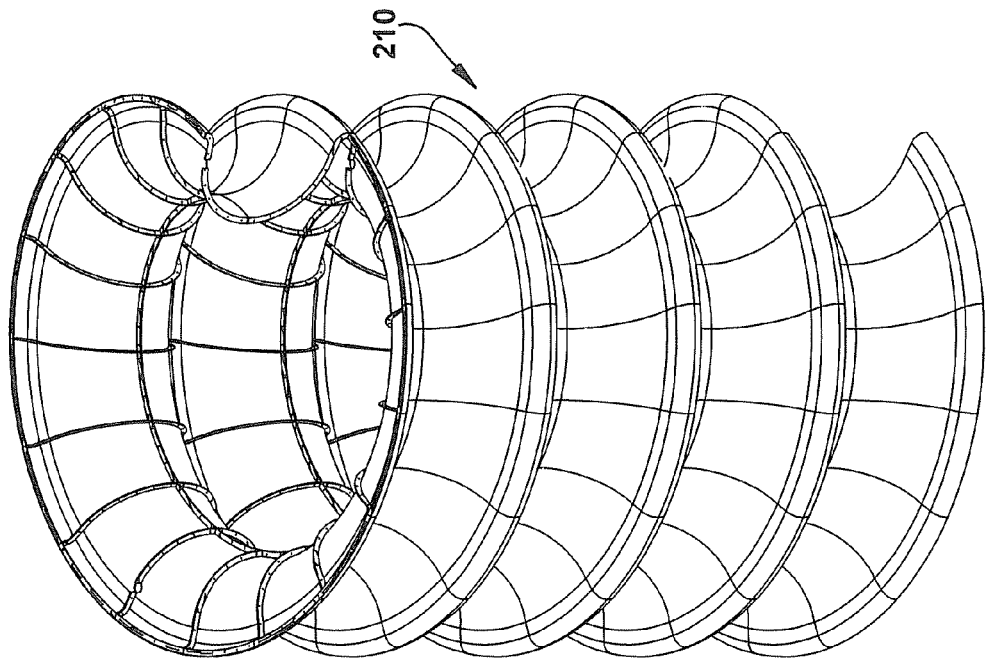
FIG. 14 a front view of a plurality of the shell panels shown in FIGS. 10A and 10B connected to form a substantial majority of a helical shell used in the wind harnessing system of FIG. 9.
Figure 13:
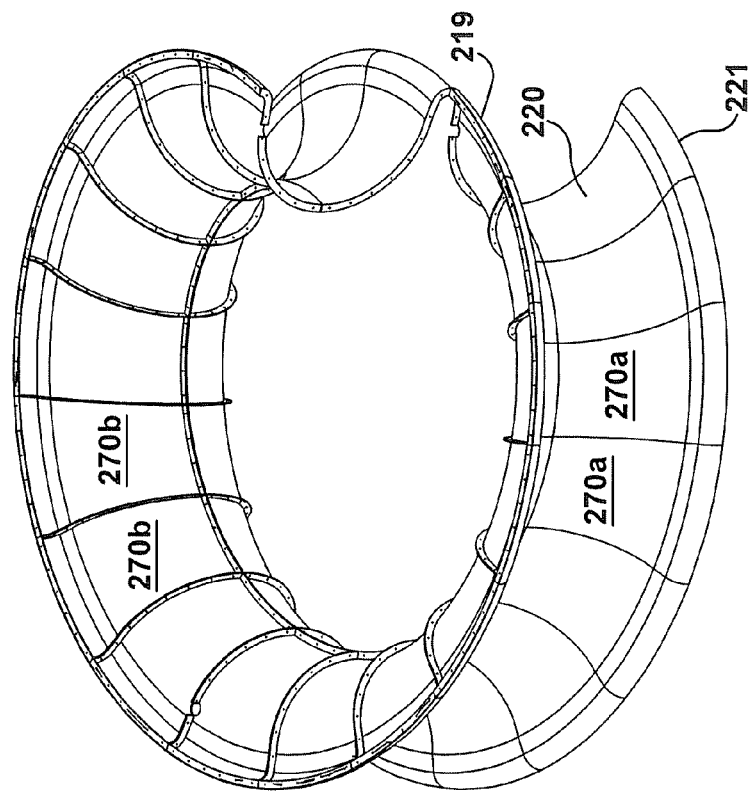
FIG. 13 is a front view of a plurality of shell panels shown in FIGS. 10A and 10B connected to form a portion of a helical shell of the wind harnessing system of FIG. 9.

FIGS. 13 and 14 show the relative position of shell panels 270 to form one turn of the helical wind deflecting structure and multiple turns of the helical wind deflecting structure, respectively. The shell panels 270 may be rigid enough that the helical shell 210 holds its shape without the aid of an interior structure. Alternatively, the deflecting structure 210 may rely on an interior structure to maintain its configuration.

Figure 16:
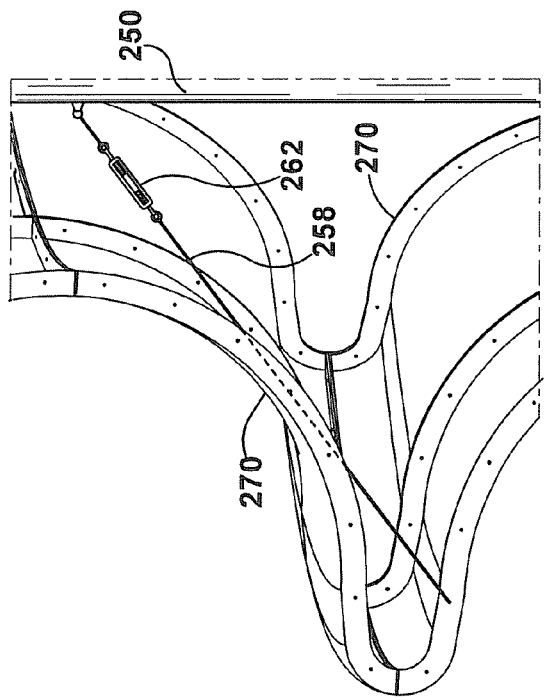
FIG. 16 is a side view of four of the shell panels of FIGS. 10A and 10B connected to the frame of FIG. 15.
Figure 15:
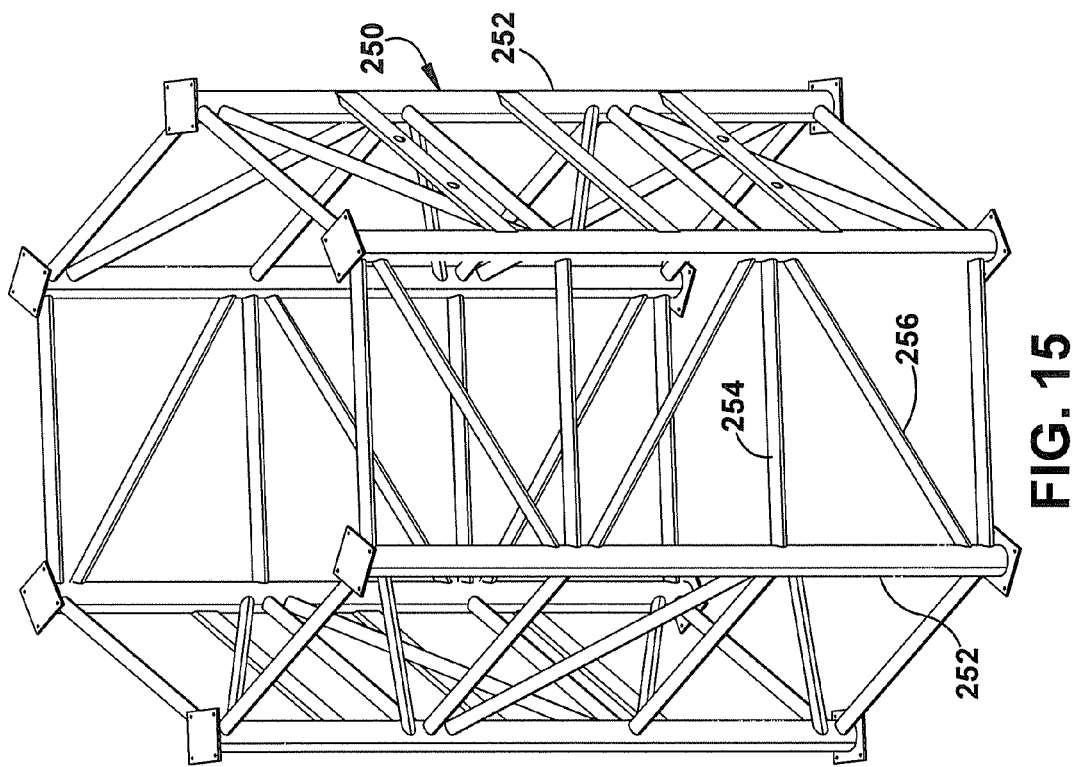
FIG. 15 is a front view of a frame used in construction of the wind harnessing system of FIG. 9.

FIG. 15 illustrates a mounting structure 250 constructed of rigid material such as, for example tubular steel or aluminum. The mounting structure includes a number of vertical supports 252, horizontal braces 254 and diagonal braces 256. The mounting structure is configured to be connected to a ground surface by, for example, burying a bottom end of the vertical supports in the ground or fastening the bottom end of the vertical supports to a concrete pad. The mounting structure may be assembled at the installation site and the shell panels 270 may be attached around the mounting structure. FIG. 16 illustrates one configuration for connecting the shell panels 270 to the mounting structure 250. A cable 258 is coupled at one end to the mounting structure and at another end to the shell panel 270. The cable may pass through a fastener opening 272 on the shell panel or may be coupled to a dedicated cable anchor. A length adjusting device such as a turnbuckle 262 may be employed to allow the cable's length to be adjusted to position the wind deflecting structure relative to the mounting structure. Such adjustments may be advantageous during initial installation as well as to compensate for warping or other changes in shell shape that occur during usage of the wind harnessing system. Alternatively, a rod (not shown) may be used in place of the cable to connect the shell panels 270 to the mounting structure 250 to obtain the same result.

Figure 17:
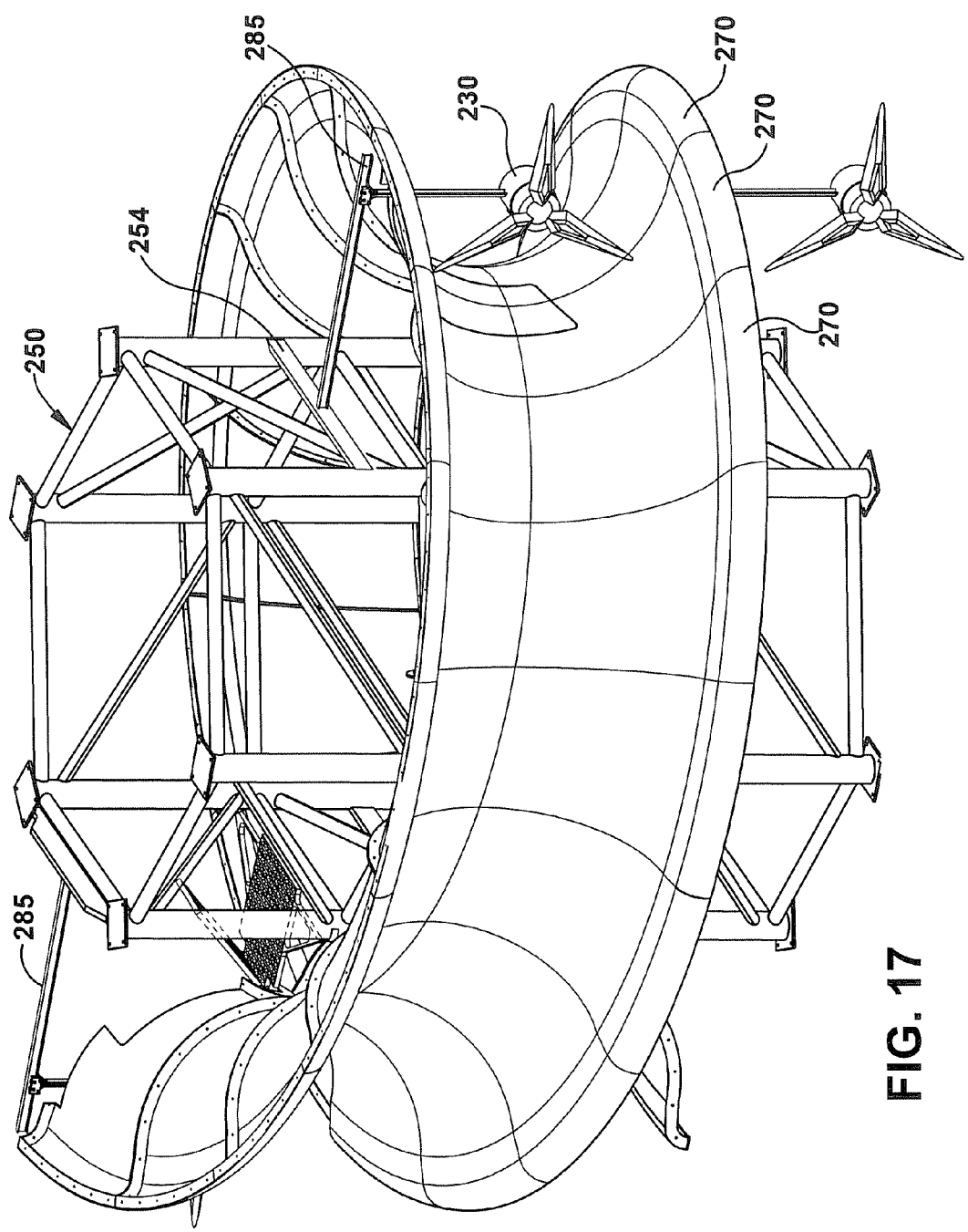
FIG. 17 is a fragmentary view of the wind harnessing system of FIG. 9 showing the frame, one turn of the helical shell and turbines installed within the grooves of the shell.
Figure 18:
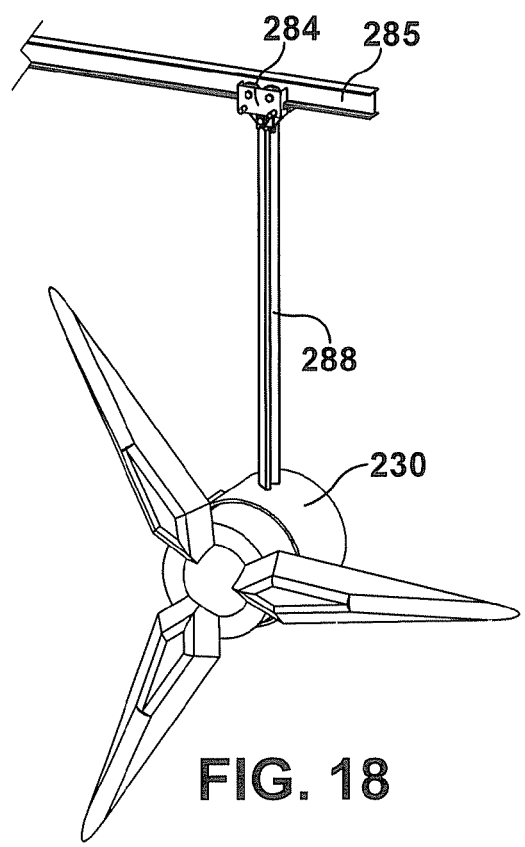
FIG. 18 is a front view of a turbine mounting configuration forming part of the wind harnessing system of FIG. 9.
Figure 19:
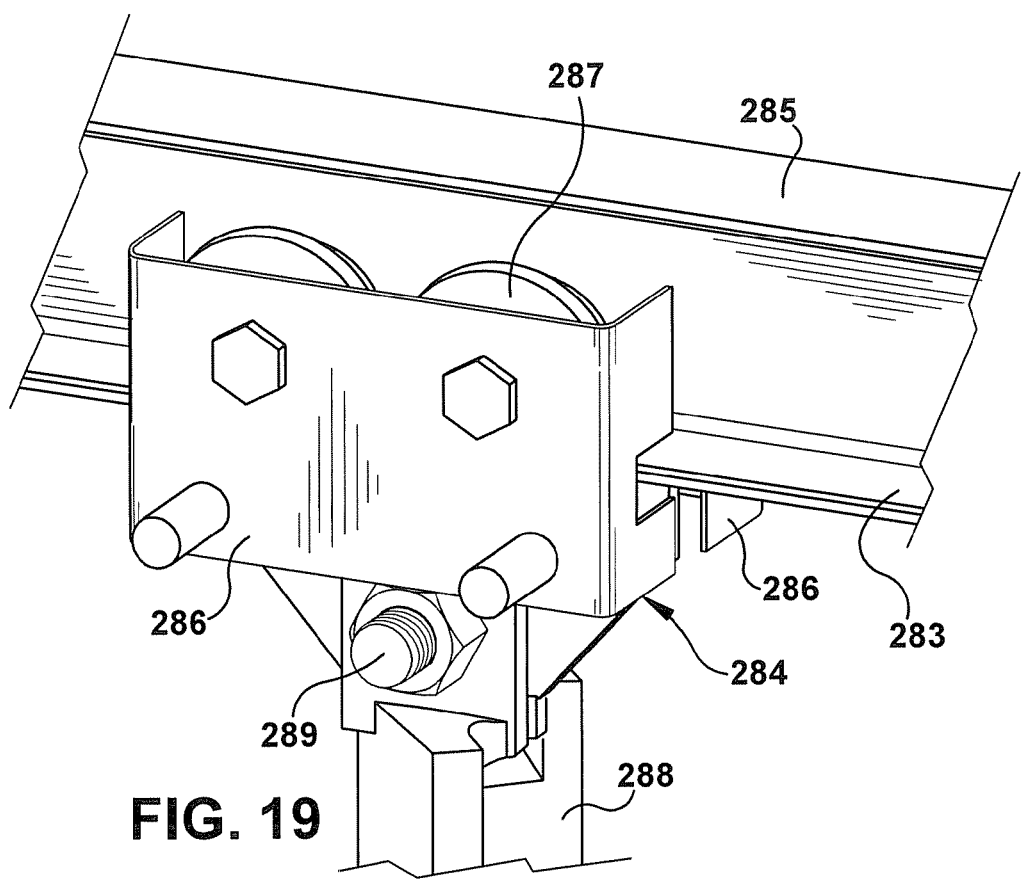
FIG. 19 is an enlarged view of a hanger trolley that is part of the mounting configuration shown in FIG. 18.

FIG. 17 illustrates a single turn of the helical wind deflecting structure with a turbine 230 installed at every 180 degrees. A plurality of turbine struts 285 extend radially from the mounting structure. The turbine struts may have an I beam configuration for strength. A turbine hanger 288 is connected to each turbine strut. The turbine hanger extends perpendicular to the turbine strut and protrudes through the shell 210. Each turbine 230 is positioned within the groove of the helical wind deflecting spiral on a turbine hanger 288. As can be seen in more detail in FIGS. 18 and 19, the turbine hanger may include a trolley 284 that can slide along the length of the turbine strut. The trolley 284 includes wheels 287 that roll along a flange 283 on the I beam of the turbine strut. The wheels are housed within a housing plate 286 that is slotted to accommodate the flange 283. A pair of opposing housing plates 286 can be fastened around the flange 283 with a bolt 289 to slidably connect the trolley 284 to the turbine strut 285. In this manner, the turbine hanger can be repositioned to place the turbine 230 in a preferred position within the groove, or the turbine hanger may be moved into proximity with the mounting structure to facilitate access to the turbine for maintenance.

Figure 20:
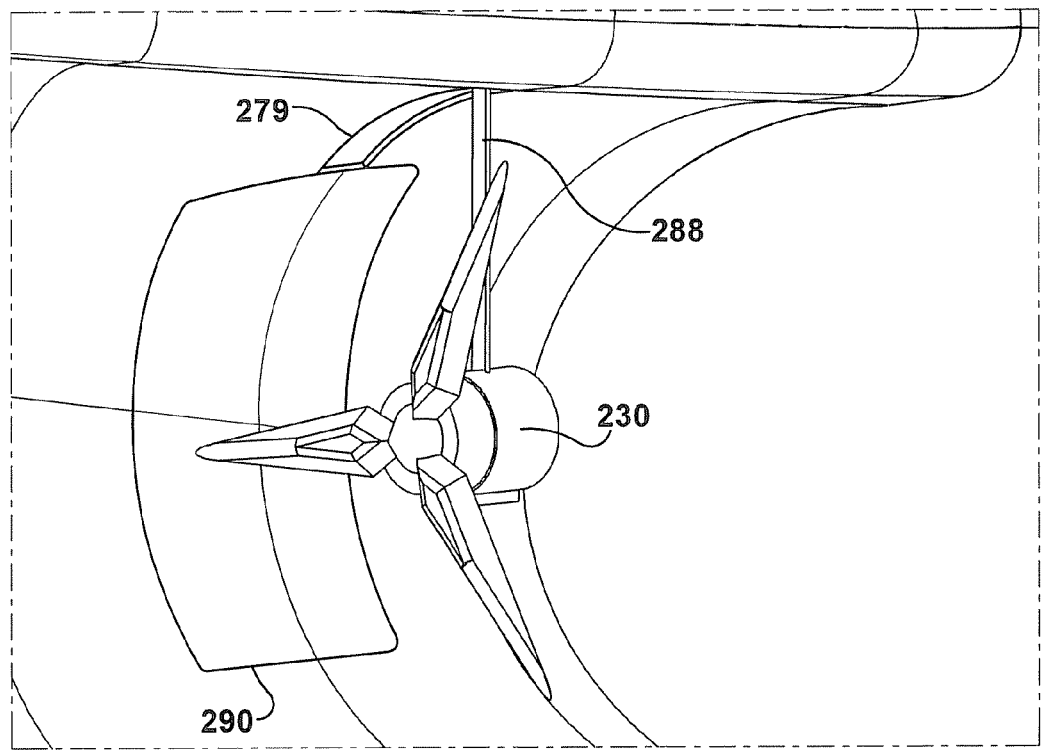
FIG. 20 is an enlarged side view of the wind harnessing system of FIG. 9 showing a turbine access door.
Figure 21:
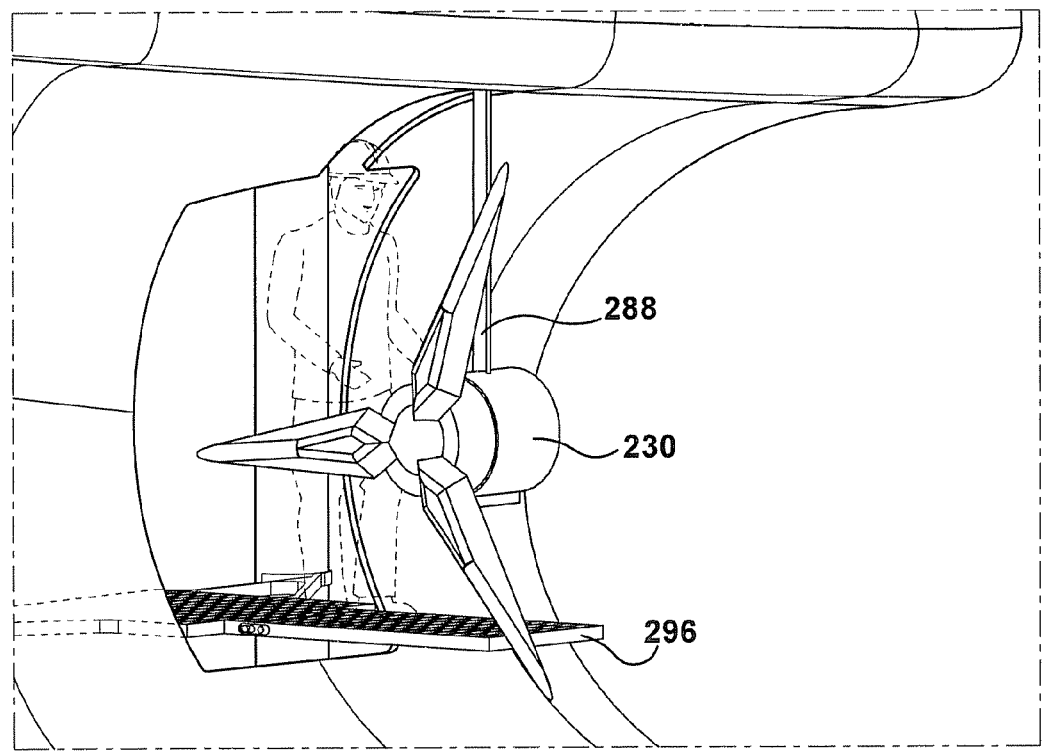
FIG. 21 is the enlarged side view of FIG. 20 showing the access door open.
Figure 22:
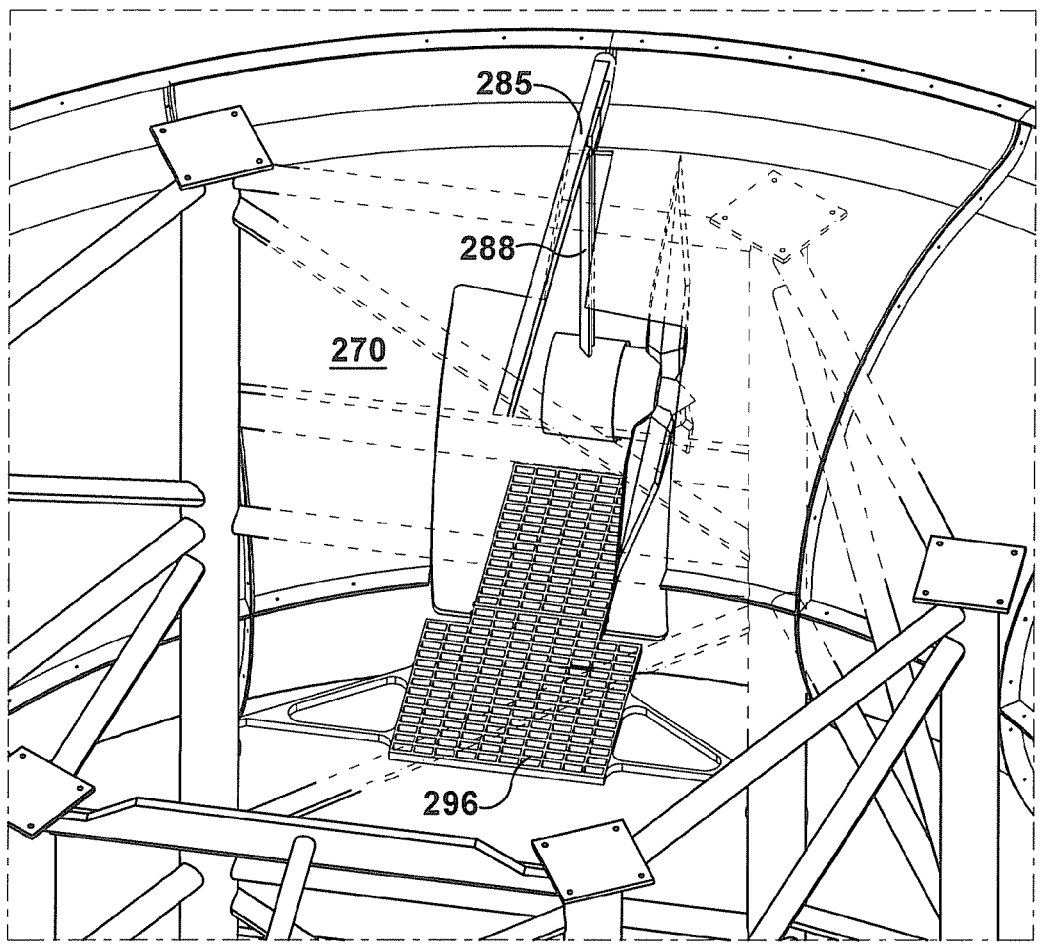
FIG. 22 is a top side view of the frame and an interior of the shell of the wind harnessing system of FIG. 9.
Figure 23:
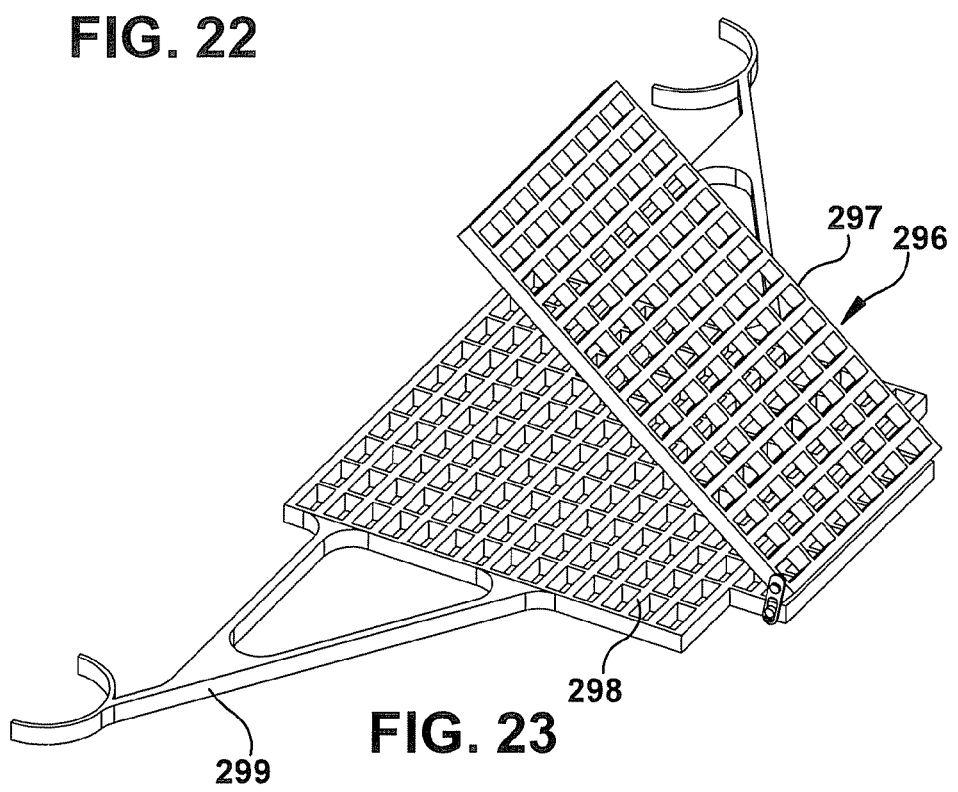
FIG. 23 is a perspective view of the operator platform shown in FIGS. 21 and 22.

FIGS. 20 and 21 illustrate a removable access door 290 that is present in one or more shell panels. When the access door is removed, a work platform 296 may be deployed by folding it out from the mounting structure where it is stowed during normal operation of the wind harnessing system. FIGS. 22 and 23 show the work platform 296 in more detail. The work platform includes a pair of mounting arms 299 configured to engage a vertical strut of the mounting structure and a pair of hinged platform portions 297, 298 that can be folded together as shown in FIG. 23 or folded apart to deploy the platform 296 as shown in FIGS. 21 and 22.

Figure 25:
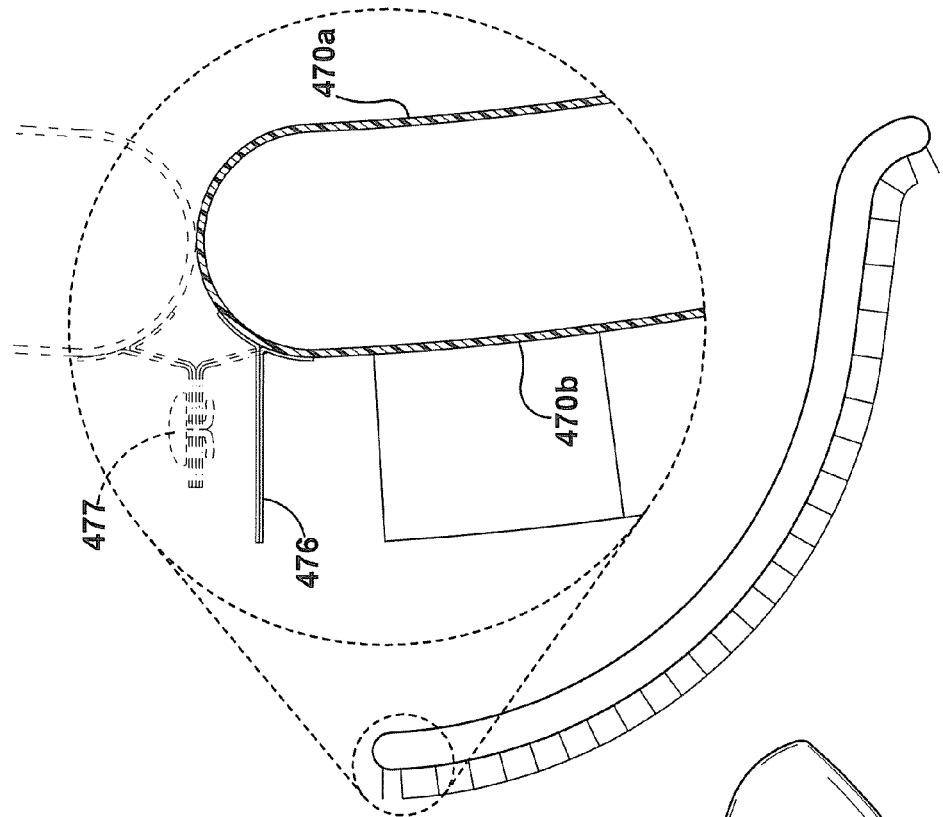
FIG. 25 is a cross section view of the inflatable shell member of FIG. 24.
Figure 24:
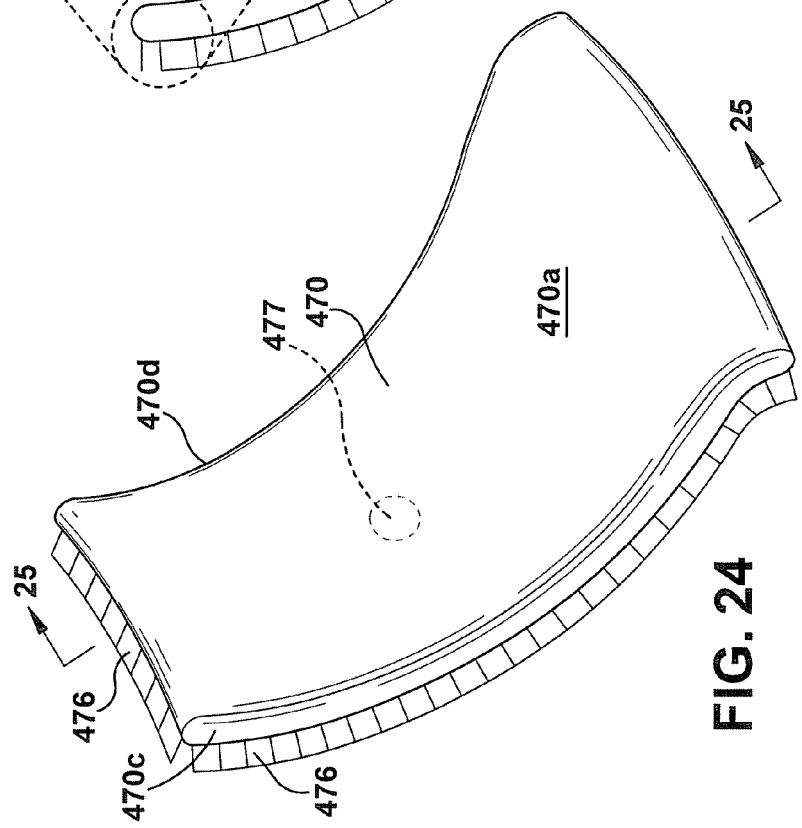
FIG. 24 is a perspective view of an inflatable shell member used in construction a wind harnessing system according to an alternative embodiment.

FIGS. 24-27 illustrate inflatable shell sections that can be used to construct the wind deflecting structure 200 of FIG. 9. The use of inflatable shell sections may present cost and weight advantages. Referring now to FIGS. 24 and 25, an inflatable shell section 470 that roughly corresponds in geometry to the shell panel 270 of FIGS. 10A and 10B is shown. The arrangement of the shell sections 470 and connection to the internal mounting frame is analogous to the description above in connection with FIGS. 9-23, and will only be summarized here. The shell panel is constructed of first and second surface sheets 470a, 470b that have a generally trapezoidal shape. The first and second surface sheets may be sealed together at their outer periphery or the shell section may include side wall sheets 470c-d as shown in FIGS. 24 and 25. One or more inflation ports 477 are presented in one or more of the wall sheets, for example in the second surface sheet 470b.

To facilitate connection of the shell sections to one another, connection tabs 476 are disposed around the shell section on the side wall sheets 470c-d. The connection tabs 476 include openings 472 to accept fasteners. When the wind deflecting structure is constructed of the inflatable shell sections 470, the sections are positioned in abutting relationship to one another and the tabs of adjacent sections are connected to one another. Alternatively fasteners may be formed into the shell sections that can be connected to the tab 476 of an abutting shell section. In this case, the sections are positioned in abutting relationship to one another and the tabs of one shell section are connected to a fastener formed in the adjacent shell section.

Figure 27:
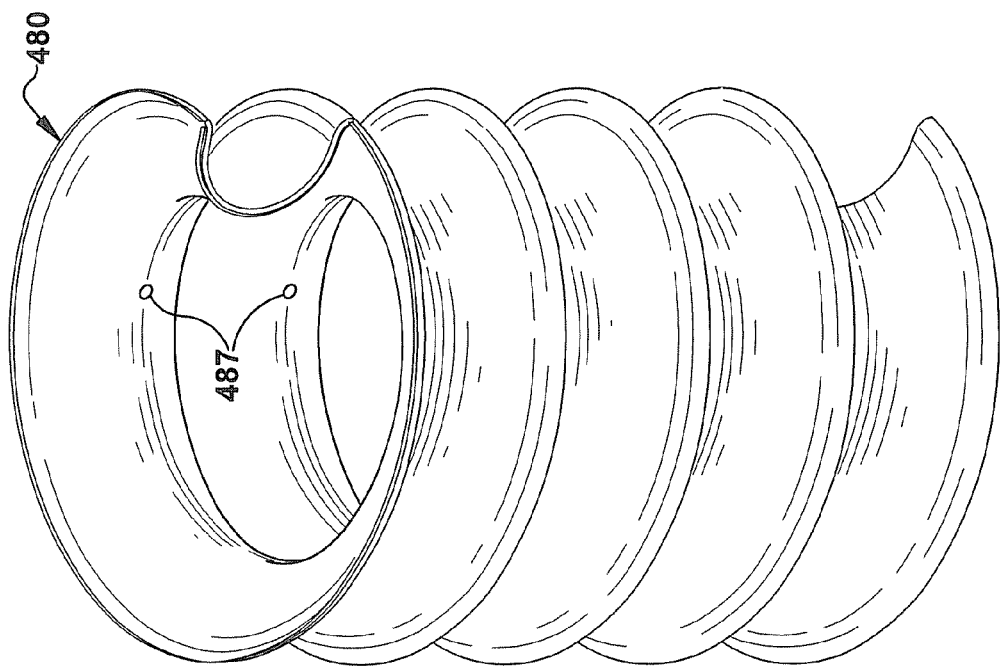
FIG. 27 is a perspective view of an inflatable shell member used in construction a wind harnessing system according to an alternative embodiment.
Figure 26:
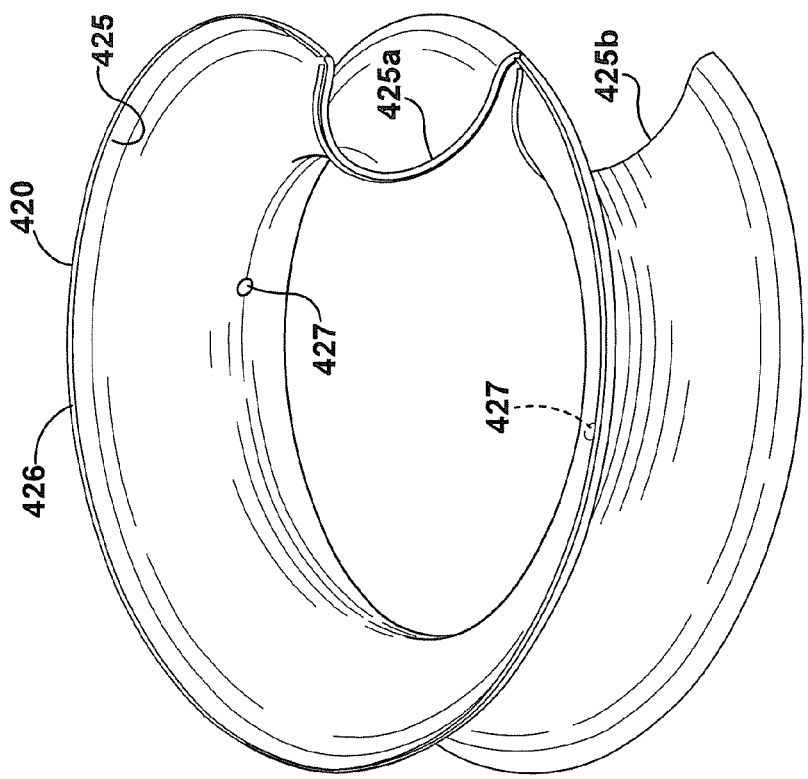
FIG. 26 is a perspective view of an inflatable shell member used in construction a wind harnessing system according to an alternative embodiment.

Referring now to FIG. 26, an inflatable shell section 420 is shown. The shell section 420 corresponds roughly to a single turn of the helical wind deflecting structure 200. The shell section 420 includes continuous connection flaps 426 around its top and bottom edges 425 and side edges 425a, 425b. One or more inflation ports 427 are present in one or walls of the inflatable shell section 420. FIG. 27 shows an inflatable shell section 480 that corresponds to the entire wind deflecting structure. The inflatable shell section 480 includes a plurality of inflation ports 487.

In wind deflecting structures that include an access panel or an opening through a shell section through which the turbine mounting struts and hangers protrude, the opening may be formed by sealing the top and bottom sheets to outline the desired opening. The opening may then be cut in the shell section while maintaining inflation of the shell section. The access panel may be separately inflatable or may be a simple sheet of an appropriate shape. Any of the shell section configurations may include a plurality of inner chamber that are sealed with respect to one another or allow only limited gas flow between chambers.

Although the present invention has been described with respect to specific embodiments, many modifications can be made without departing from the spirit and scope of the invention. All such modifications are intended to be included within the scope of the present invention, which is to be limited only by the following claims.

I claim:

1. A wind deflecting structure comprising:
a substantially rigid frame fixed to a ground surface; and
a grooved shell connected to the frame and disposed about an outer periphery of the frame, wherein the grooved shell comprises a groove ridge that protrudes from an interior core disposed near the rigid frame wherein the shell has a helical shape with the groove ridge spiraling about the core.

2. The wind deflecting structure of claim 1 wherein the grooved shell is constructed of a plurality of shell panels.

3. The wind deflecting structure of claim 2 wherein successive pairs of the shell panels are juxtaposed and connected to one another to form a three dimensional spiral shell.

4. The wind deflecting structure of claim 2 wherein the shell panels are substantially identical to one another in size and shape.

5. The wind deflecting structure of claim 2 wherein-each shell panel has a generally three dimensional trapezoidal shape, having curvatures in three orthogonal planes, said shell panel defined by two first and second opposed congruent side edges and first and second ends, and wherein the first end is shorter than the second end and wherein the first end includes a concave curve that forms a portion of the core and a second end having a convex curve and a terminating lip that forms a portion of the groove ridge.

6. The wind deflecting structure of claim 5 wherein each shell panel includes an inner surface that faces the frame and a mounting flange disposed about a shell panel periphery, wherein the mounting flange protrudes inward toward the frame and is substantially perpendicular to the inner surface.

7. The wind deflecting structure of claim 6 wherein the mounting flange includes fastener holes through which fasteners can be inserted to connect one shell panel to another.

8. The wind deflecting structure of claim 2 wherein the shell panels are made from molded plastic.

9. The wind deflecting structure of claim 2 wherein the shell panels are made from fiberglass.

10. The wind deflecting structure of claim 5 wherein the grooved shell is connected to the frame by at least one connecting member and wherein the at least one connecting member is pivotally fixed to the frame and to the shell at a shell connection location.

11. The wind deflecting structure of claim 10 wherein the shell connection location is proximate to the first end of at least one shell panel.

12. The wind deflecting structure of claim 10 wherein the shell connection location is proximate to the second end of at least one shell panel.

13. The wind deflecting structure of claim 10 wherein the connecting member includes a turnbuckle mechanism disposed between distal ends for adjusting a length of the connecting member.

14. The wind deflecting structure of claim 1 further comprising one or more turbines mounted to the frame and disposed between the core and a pair of adjacent groove ridges of the grooved shell.

15. The wind deflecting structure of claim 14 wherein the frame includes a turbine mounting strut that radiates out from the frame and a turbine mounting hanger connected to the mounting strut that extends downward from the mounting strut and protrudes through the grooved shell and wherein each turbine is connected to a distal end of the mounting hanger to be positioned between the core and the groove ridge.

16. The wind deflecting structure of claim 15 wherein the mounting hanger is slidably mounted to the mounting strut.

17. The wind deflecting structure of claim 1 wherein the grooved shell includes one or more access doors that can be opened to permit access to an exterior surface of the grooved shell.

18. A wind deflecting structure comprising:
a substantially rigid frame fixed to a ground surface; and
a grooved shell connected to the frame and disposed about an outer periphery of the frame, wherein the grooved shell comprises a groove ridge that protrudes from an interior core disposed near the rigid frame;
wherein the grooved shell includes one or more access doors that can be opened to permit access to an exterior surface of the grooved shell, and the grooved shell includes one or more extendable platforms that can be deployed through an opening created by the access door when the access door is opened.

19. The wind deflecting structure of claim 18 wherein the shell has a helical shape with the groove ridge spiraling about the core.

20. The wind deflecting structure of claim 1 wherein the helical shell is constructed of a plurality of shell members, each approximately corresponding to a single turn of the helical shell.

21. The wind deflecting structure of claim 14 wherein a longitudinal axis of the turbine is aligned substantially parallel to the groove ridges between which the turbine is installed.

22. The wind deflecting structure of claim 2 wherein each shell panel comprises an inflatable shell section having flexible inner and outer sheet surfaces sealed to one another to form an expandable chamber into which a gas can be placed.

23. The wind deflecting structure of claim 22 wherein each inflatable shell section, when inflated, defines curved outer surfaces that define the core and the groove ridge when inflated.

24. The wind deflecting structure of claim 22 wherein each shell panel includes one or more connecting tabs disposed about an outer periphery.

25. The wind deflecting structure of claim 1 wherein the shell comprises one or more inflatable chambers defined by inner and outer shell surfaces.

26. The wind deflecting structure of claim 1 wherein the helical shell comprises one or more inflatable chambers defined by inner and outer shell surfaces.

27. The wind deflecting structure of claim 10, wherein the connecting member comprises a cable.

28. A wind deflecting structure comprising:
a substantially rigid frame fixed to a ground surface; and
a grooved shell connected to the frame and disposed about an outer periphery of the frame, wherein the grooved shell comprises a groove ridge that protrudes from an interior core disposed near the rigid frame;
wherein the grooved shell is constructed of a plurality of shell panels, and at least one of the plurality of shell panels is connected to the frame by at least one connecting member, the connecting member being pivotally fixed to the frame and to the at least one shell panel at a shell connection location.

29. The wind deflecting structure of claim 28, wherein the connecting member comprises a cable.

* * * * *